(12) United States Patent
Iyer et al.

(10) Patent No.: US 11,347,566 B2
(45) Date of Patent: May 31, 2022

(54) ADAPTIVE RUNTIME PRIORITIZATION FOR COMPONENT PLUGINS

(71) Applicant: Dell Products, L.P., Round Rock, TX (US)

(72) Inventors: Vivek Viswanathan Iyer, Austin, TX (US); Srikanth Kondapi, Austin, TX (US); Abhinav Gupta, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 367 days.

(21) Appl. No.: 16/783,846

(22) Filed: Feb. 6, 2020

(65) Prior Publication Data
US 2021/0248018 A1 Aug. 12, 2021

(51) Int. Cl.
*G06F 9/54* (2006.01)
*G06F 9/445* (2018.01)
*G06F 9/50* (2006.01)
*G06N 20/00* (2019.01)

(52) U.S. Cl.
CPC .......... *G06F 9/541* (2013.01); *G06F 9/44526* (2013.01); *G06F 9/50* (2013.01); *G06N 20/00* (2019.01)

(58) Field of Classification Search
CPC ........ G06F 9/541; G06F 9/44526; G06F 9/50; G06N 20/00
See application file for complete search history.

(56) References Cited

U.S. PATENT DOCUMENTS

| | | | |
|---|---|---|---|
| 2009/0083740 A1* | 3/2009 | Mathew | G06F 9/5055 718/102 |
| 2015/0058868 A1* | 2/2015 | Padinjarel | G06F 9/541 719/316 |
| 2015/0172133 A1* | 6/2015 | Nagashima | H04L 43/0823 709/223 |
| 2018/0026947 A1* | 1/2018 | Haworth | H04L 63/0442 713/168 |
| 2020/0142471 A1* | 5/2020 | Azam | G06F 1/3265 |
| 2021/0240493 A1* | 8/2021 | Hamlin | G09G 5/003 |

* cited by examiner

Primary Examiner — Sisley N Kim
(74) Attorney, Agent, or Firm — Fogarty LLP (57) ABSTRACT

Methods and systems are provided for supporting operation of a plurality of software plugins of an IHS (Information Handling System). Incoming plugin commands are received and stored to a queue of a plurality of progressively weighted queues. The weighted queue is selected for storing the incoming plugin command based on a time constraint associated with the command. A proximate command is selected for processing from a queue of the plurality of weighted queues based on a weighted time for processing the proximate command. A recipient plugin of the proximate command is determined. Any plugin groups that the recipient is a member of are identified. The plugins of the first plugin group, including the recipient plugin, are activated to allocate use of IHS resources to the activated plugin.

20 Claims, 4 Drawing Sheets

ADAPTIVE RUNTIME PRIORITIZATION FOR COMPONENT PLUGINS

FIELD

This disclosure relates generally to Information Handling Systems (IHSs), and more specifically, to managing the utilization of IHS resources.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

In the operation of an IHS, various hardware resources of the IHS are used to operate software applications that run within an environment provided by an operating system. As the number of software applications that run in an operating system increases, the contention for use of system resources generally also increases. In some instances, software applications of an operating system may manage their own use of system resources, within certain limitations and restrictions. Nonetheless, as the number of software applications in an operating system increases, the resource footprint of the operating system generally also increases.

SUMMARY

In various embodiments, methods are provided for supporting operation of a plurality of software plugins of an IHS (Information Handling System). The methods may include: receiving an incoming plugin command; storing the incoming plugin command to a queue of a plurality of progressively weighted queues, and wherein the queue is selected for storing the incoming plugin command based on a time constraint associated with the incoming plugin command; selecting a proximate command for processing from a queue of the plurality of queues, wherein the proximate command is selected based on a weighted time for processing the proximate command; determining a recipient plugin of the proximate command; determining when the recipient plugin is a member of a first plugin group; and activating a plurality of plugins of the first plugin group, wherein the activation of a plugin allocates use of IHS resources to the activated plugin.

In additional method embodiments, the first plugin group is learned based on monitoring of plugin activations in response to incoming plugin commands. In additional method embodiments, the incoming plugin command comprises a user proximity notification. In additional embodiments, the methods may further include deactivating the plurality of plugins of the first plugin group in response to the completed processing of the proximate command by the recipient plugin. In additional method embodiments, each of the plurality of queues are progressively weighted using a scaling factor. In additional method embodiments, the weighted time for processing the proximate command is determined according to the scaling factor of the queue used to store the proximate command. In additional method embodiments, the time constraint associated with the incoming plugin command designates the incoming plugin command as a real-time command.

In various additional embodiments, Information Handling Systems (IHSs) are configured for supporting operation of a plurality of software plugins of the IHS. The IHS may include: one or more processors; and a memory device coupled to the one or more processors, the memory device storing computer-readable instructions that, upon execution by the one or more processors, cause the IHSs to: receive an incoming plugin command; store the incoming plugin command to a queue of a plurality of progressively weighted queues, and wherein the queue is selected for storing the incoming plugin command based on a time constraint associated with the incoming plugin command; select a proximate command for processing from a queue of the plurality of queues, wherein the proximate command is selected based on a weighted time for processing the proximate command; determine a recipient plugin of the proximate command; determine when the recipient plugin is a member of a first plugin group; and activate a plurality of plugins of the first plugin group, wherein the activation of a plugin allocates use of IHS resources to the activated plugin.

In additional IHS embodiments, the first plugin group is learned based on monitoring of plugin activations in response to incoming plugin commands. In additional IHS embodiments, the incoming plugin command comprises a user proximity notification. In additional IHS embodiments, instructions further cause the IHSs to deactivate the plurality of plugins of the first plugin group in response to the completed processing of the proximate command by the recipient plugin. In additional IHS embodiments, each of the plurality of queues are progressively weighted using a scaling factor. In additional IHS embodiments, the weighted time for processing the proximate command is determined according to the scaling factor of the queue used to store the proximate command. In additional IHS embodiments, the time constraint associated with the incoming plugin command designates the incoming plugin command as a real-time command.

In various additional embodiments, computer-readable storage devices include program instructions stored thereon for supporting operation of a plurality of software plugins of an Information Handling System (IHS). Upon execution by one or more processors, the program instructions cause the one or more processors to: receive an incoming plugin command; store the incoming plugin command to a queue of a plurality of progressively weighted queues, and wherein the queue is selected for storing the incoming plugin command based on a time constraint associated with the incoming plugin command; select a proximate command for processing from a queue of the plurality of queues, wherein the proximate command is selected based on a weighted time for processing the proximate command; determine a recipient plugin of the proximate command; determine when the recipient plugin is a member of a first plugin group; and activate a plurality of plugins of the first plugin group, wherein the activation of a plugin allocates use of IHS resources to the activated plugin.

In additional storage device embodiments, the first plugin group is learned based on monitoring of plugin activations in response to incoming plugin commands. In additional storage device embodiments, the incoming plugin command comprises a user proximity notification. In additional storage device embodiments, each of the plurality of queues are progressively weighted using a scaling factor. In additional storage device embodiments, the weighted time for processing the proximate command is determined according to the scaling factor of the queue used to store the proximate command. In additional storage device embodiments, the time constraint associated with the incoming plugin command designates the incoming plugin command as a real-time command.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources, such as a Central Processing Unit (CPU) or hardware or software control logic, Read-Only Memory (ROM), and/or other types of nonvolatile memory.

Figure 1:
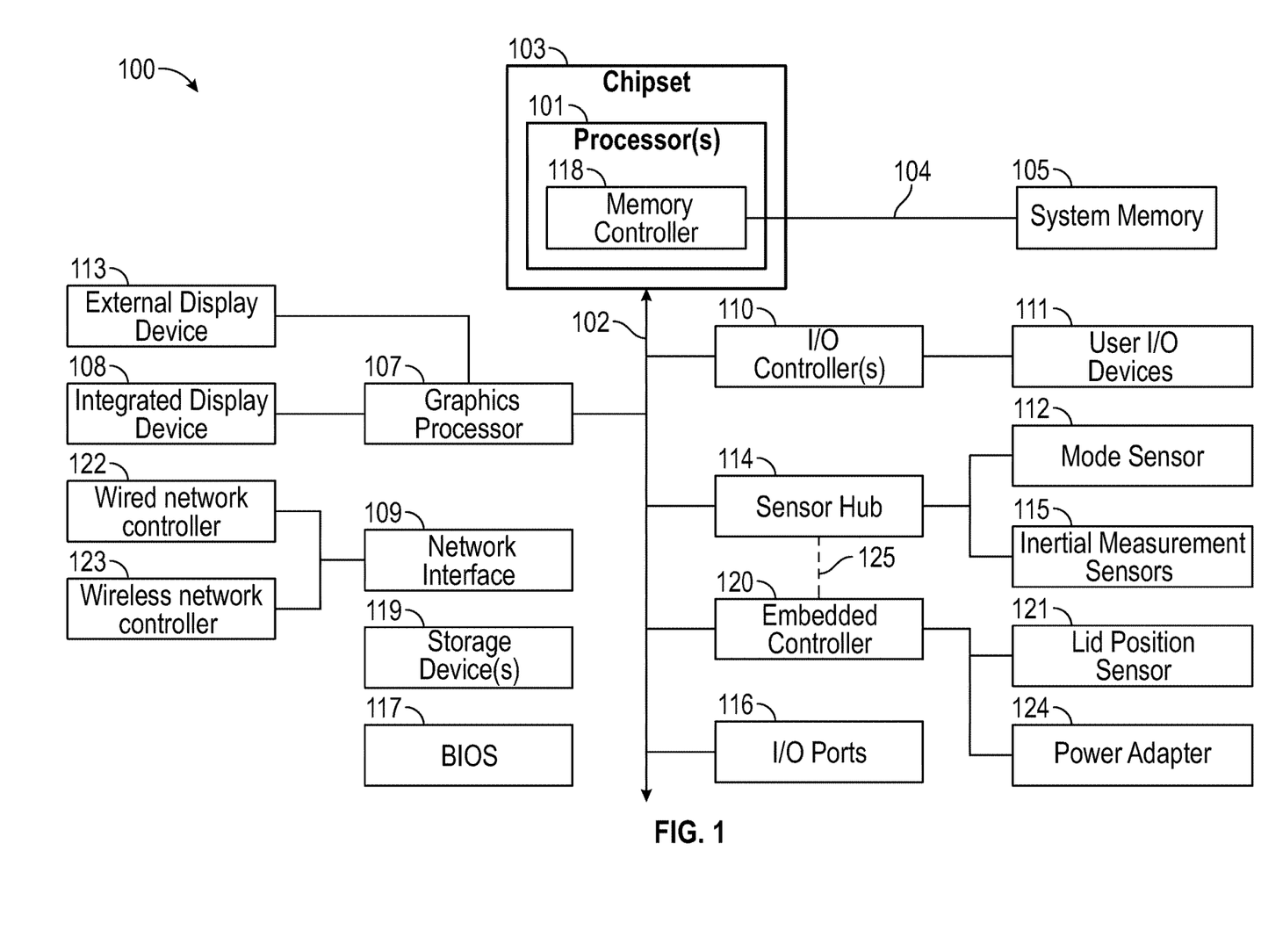
FIG. 1 is a block diagram depicting certain components of an IHS configured according to various embodiments for adaptive runtime prioritization and resource management for component plugins of the IHS.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below. FIG. 1 shows an example of an IHS configured to implement the systems and methods described herein according to certain embodiments. It should be appreciated that although certain IHS embodiments described herein may be discussed in the context of a personal computing device, other embodiments may be utilized.

FIG. 1 is a block diagram illustrating certain components of an IHS 100 configured according to certain embodiments for adaptive runtime prioritization and resource management for component plugins of the IHS 100. In various embodiments, IHS 100 may include an embedded controller 120 that may execute program instructions that perform certain of the operations disclosed herein for configuration of peripherals coupled to IHS 100. In certain embodiments, IHS 100 may be configured as a member of an enterprise network by which a variety of computing services may be provided to a user of IHS 100. In certain embodiments, an enterprise network may provide remote computing services for supporting and improving certain operations by IHS 100.

IHS 100 includes one or more processors 101, such as a Central Processing Unit (CPU), that execute code retrieved from a system memory 105. Although IHS 100 is illustrated with a single processor 101, other embodiments may include two or more processors, that may each be configured identically, or to provide specialized processing functions. Processor 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, the processor 101 includes an integrated memory controller 118 that may be implemented directly within the circuitry of the processor 101, or the memory controller 118 may be a separate integrated circuit that is located on the same die as the processor 101. The memory controller 118 may be configured to manage the transfer of data to and from the system memory 105 of the IHS 100 via a high-speed memory interface 104. The system memory 105 that is coupled to processor 101 provides the processor 101 with a high-speed memory that may be used in the execution of computer program instructions by the processor 101. Accordingly, system memory 105 may include memory components, such as such as static RAM (SRAM), dynamic RAM (DRAM), NAND Flash memory, suitable for supporting high-speed memory operations by the processor 101. In certain embodiments, system memory 105 may combine both persistent, non-volatile memory and volatile memory. In certain embodiments, the system memory 105 may be comprised of multiple removable memory modules.

IHS 100 utilizes a chipset 103 that may include one or more integrated circuits that are connect to processor 101. In the embodiment of FIG. 1, processor 101 is depicted as a component of chipset 103. In other embodiments, all of chipset 103, or portions of chipset 103 may be implemented directly within the integrated circuitry of the processor 101. Chipset 103 provides the processor(s) 101 with access to a variety of resources accessible via bus 102. In IHS 100, bus 102 is illustrated as a single element. Various embodiments may utilize any number of separate buses to provide the illustrated pathways served by bus 102.

In various embodiments, IHS 100 may include one or more I/O ports 116 that may support removeable couplings with various types of external devices and systems, including removeable couplings with peripheral devices that may be configured for operation by a particular user of IHS 100.

For instance, I/O 116 ports may include USB (Universal Serial Bus) ports, by which a variety of external devices may be coupled to IHS 100. In addition to or instead of USB ports, I/O ports 116 may include various types of physical I/O ports that are accessible to a user via the enclosure of the IHS 100.

In certain embodiments, chipset 103 may additionally utilize one or more I/O controllers 110 that may each support the operation of hardware components such as user I/O devices 111 that may include peripheral components that are physically coupled to an I/O port 116 and/or peripheral components that are wirelessly coupled to IHS 100 via a network interface 109. In various embodiments, I/O controller 110 may support the operation of one or more user I/O devices 110 such as a keyboard, mouse, touchpad, touchscreen, microphone, speakers, camera and other input and output devices that may be coupled to IHS 100. As described, user I/O devices 111 may interface with an I/O controller 110 through wired or wireless couplings supported by IHS 100. In certain embodiments, I/O controllers 110 may support configurable operation of supported peripheral devices, such as user I/O devices 110.

As illustrated, a variety of additional resources may be coupled to the processor(s) 101 of the IHS 100 through the chipset 103. For instance, chipset 103 may be coupled to a network interface 109 that may support different types of network connectivity. In certain embodiments, IHS 100 may include one or more Network Interface Controllers (NICs) 122, 123, each of which may implement the hardware required for communicating via a specific networking technology, such as W-Fi, BLUETOOTH, Ethernet and mobile cellular networks (e.g., CDMA, TDMA, LTE). As illustrated, network interface 109 may support network connections by wired network controllers 122 and wireless network controllers 123. Each network controller 122, 123 may be coupled via various buses to the chipset 103 of IHS 100 in supporting different types of network connectivity, such as the network connectivity utilized by the operating system of IHS 100.

Chipset 103 may also provide access to one or more display device(s) 108, 113 via graphics processor 107. In certain embodiments, graphics processor 107 may be comprised within a video card, graphics card or within an embedded controller installed within IHS 100. In certain embodiments, graphics processor 107 may be integrated within processor 101, such as a component of a system-on-chip. Graphics processor 107 may generate display information and provide the generated information to one or more display device(s) 108, 113 coupled to the IHS 100. The one or more display devices 108, 113 coupled to IHS 100 may utilize LCD, LED, OLED, or other display technologies. Each display device 108, 113 may be capable of receiving touch inputs such as via a touch controller that may be an embedded component of the display device 108, 113 or graphics processor 107, or may be a separate component of IHS 100 accessed via bus 102. In some embodiments, power to graphics processor 107, integrated display device 108 and/or external display 133 may be turned off, or configured to operate at minimal power levels, in response to IHS 100 entering a low-power state. As illustrated, IHS 100 may support an integrated display device 108, such as a display integrated into a laptop, tablet, 2-in-1 convertible device, or mobile device. IHS 100 may also support use of one or more external displays 113, such as external monitors that may be coupled to IHS 100 via various types of couplings, such as by connecting a cable from the external display 113 to an external I/O port 116 of the IHS 100.

Chipset 103 also provides processor 101 with access to one or more storage devices 119. In various embodiments, storage device 119 may be integral to the IHS 100 or may be external to the IHS 100. In certain embodiments, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In certain embodiments, storage device 119 may be a system of storage devices, such as a cloud system or enterprise data management system that is accessible via network interface 109.

As illustrated, IHS 100 also includes a BIOS (Basic Input/Output System) 117 that may be stored in a non-volatile memory accessible by chipset 103 via bus 102. Upon powering or restarting IHS 100, processor(s) 101 may utilize BIOS 117 instructions to initialize and test hardware components coupled to the IHS 100. The BIOS 117 instructions may also load an operating system for use by the IHS 100. The BIOS 117 provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI. In certain embodiments, the initialization of IHS 100 by BIOS 117 may be paused to allow for the validation of instructions utilized by a trusted component, such as secure processor 127, in order to establish a hardware root of trust in the trusted component that may then be utilized to support certain secure operations of IHS 100, such as user authentication.

As illustrated, certain IHS 100 embodiments may utilize a sensor hub 114 capable of determining the relative orientation and movement of IHS 100. For instance, sensor hub 114 may utilize inertial movement sensors 115, that may include accelerometer, gyroscope and magnetometer sensors and are capable of determining the current orientation and movement of IHS 100 (e.g., IHS 100 is motionless on a relatively flat surface or IHS 100 is being moved irregularly and is likely in transport or in mobile use). In certain embodiments, sensor hub 114 may also include capabilities for determining a location and movement of IHS 100 based on triangulation of network signal information and/or based on information accessible via the operating system or a location subsystem, such as a GPS module. In some embodiments, sensor hub 114 may support additional sensors, such as optical, infrared and sonar sensors, that may provide support for xR (virtual, augmented, mixed reality) sessions hosted by the IHS 100 and may be used by sensor hub 114 to provide an indication of a user's presence near IHS 100.

In embodiments where IHS 100 may support multiple physical configurations, sensor hub 114 may include a mode sensor 112 capability that provides a determination of the current mode in which the IHS 100 is physically configured. In certain embodiments, such physical mode determinations may be made using the movement and orientation determinations made by the sensor hub 114 using the inertial movement sensors 115. In embodiments where IHS 100 is a laptop or a convertible laptop, sensor hub 114 may further utilize a hinge angle sensor to determine the relative angle between the two panels of the laptop in order to determine the mode in which IHS 100 is physically configured.

In certain embodiments, sensor hub 114 may be an independent microcontroller or other logic unit that is coupled to the motherboard of IHS 100. In certain embodiments, sensor hub 114 may be a component of an integrated system-on-chip incorporated into processor 101 In some embodiments, sensor hub 114 may communicate with chipset 103 of processor 101 via a bus connection such as an Inter-Integrated Circuit (I2C) bus or other suitable type of bus connection. Sensor hub 114 may also utilize an I2C bus for communicating with various sensors supported by IHS 100, such as the mode sensor 112, inertial measurement sensors 115 and sensors that may be used for determining a user's presence near the IHS 100. Sensor hub 114 may collect and processes data from such sensors using data fusion techniques in order to determine contextual information regarding the operational state of IHS 100. As described in additional detail with regard to FIGS. 2 and 3, the contextual information generated by sensor hub 114 may be utilized in identifying scenarios in which groups of software plugins may be advantageously activated and/or deactivated. For instance, various aspects of the operations of IHS 100 may be configured to respond to the detection of user's presence in proximity to IHS 100, such as initiating certain power management procedures upon detecting a user moving away from IHS 100 or initiating a predefined set of user applications upon detecting a user moving closer to IHS 100. As described in additional detail below, in certain embodiments, groups of software plugins associate with such user-presence events may be identified through machine learning capabilities. Once such groups of software plugins are identified, they may be configured for processing a sequence of plugin commands that are triggered by an initial plugin command, such as a command indicating a change in detected user proximity. Also as described in additional detail below, embodiments may activate software plugins upon detecting conditions indicating expected use of the plugins and may also deactivate plugins once no longer in use, thus conserving the resources of the IHS 100. In some embodiments, data used to operate frequently used plugins may be cached, such as in system memory 105 or in a memory maintained by embedded controller 120, thus improving responsiveness of certain plugins. In some embodiments, such caching may include persistent storage of data used to operate frequently used plugins, thus improving responsiveness of certain plugins across power cycles of IHS 100.

As illustrated, IHS 100 embodiments may utilize an embedded controller 120 that may be a motherboard component of IHS 100 and may include one or more logic units. In certain embodiments, embedded controller 120 may operate from a separate power plane from the main processors 101 and thus the operating system functions of IHS 100. Firmware instructions utilized by embedded controller 120 may be used to operate a secure execution environment that may include operations for providing various core functions of IHS 100, such as power management, management of operating modes in which IHS 100 may be physically configured and support for certain integrated I/O functions. In certain embodiments, the operations of the secure execution environment of embedded controller 120 may include operations described herein for supporting the adaptive runtime prioritization and resource management for component plugins, such as supporting caching of frequently used plugin data.

Embedded controller 120 may also implement operations for interfacing with a power adapter 124 in managing power for IHS 100. Such operations may be utilized to determine the power status of IHS 100, such as whether IHS 100 is operating from battery power or is plugged into an AC power source. Embedded controller 120 may also implement operations in support of the detection of changes to the physical configuration of IHS 100 and in managing the modes corresponding to different physical configurations of IHS 100. For instance, in embodiments where IHS 100 is a laptop computer or a convertible laptop computer, embedded controller 120 may receive inputs from a lid position sensor 121 and utilize these inputs to determine whether the two sides of the laptop have been latched together to a closed position. In response to lid position sensor 121 detecting latching of the lid of IHS 100, embedded controller 120 may initiate operations for shutting down IHS 100 or placing IHS 100 in a low-power state. In certain embodiments, embedded controller 120 may be configured to place IHS 100 in a low-power state based on various conditions, such as based on a detected period of inactivity. Embedded controller 120 may rely on sensor hub 114 in order to process certain contextual inputs collected by the embedded controller 120 and the sensor hub 114. In some embodiments, embedded controller 120 and sensor hub 114 may communicate during low-power states via an out-of-band signaling pathway 125 that allows the processing of contextual inputs to be shared in various combinations between these two components.

In various embodiments, an IHS 100 does not include each of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 101 as a systems-on-a-chip.

Figure 2:
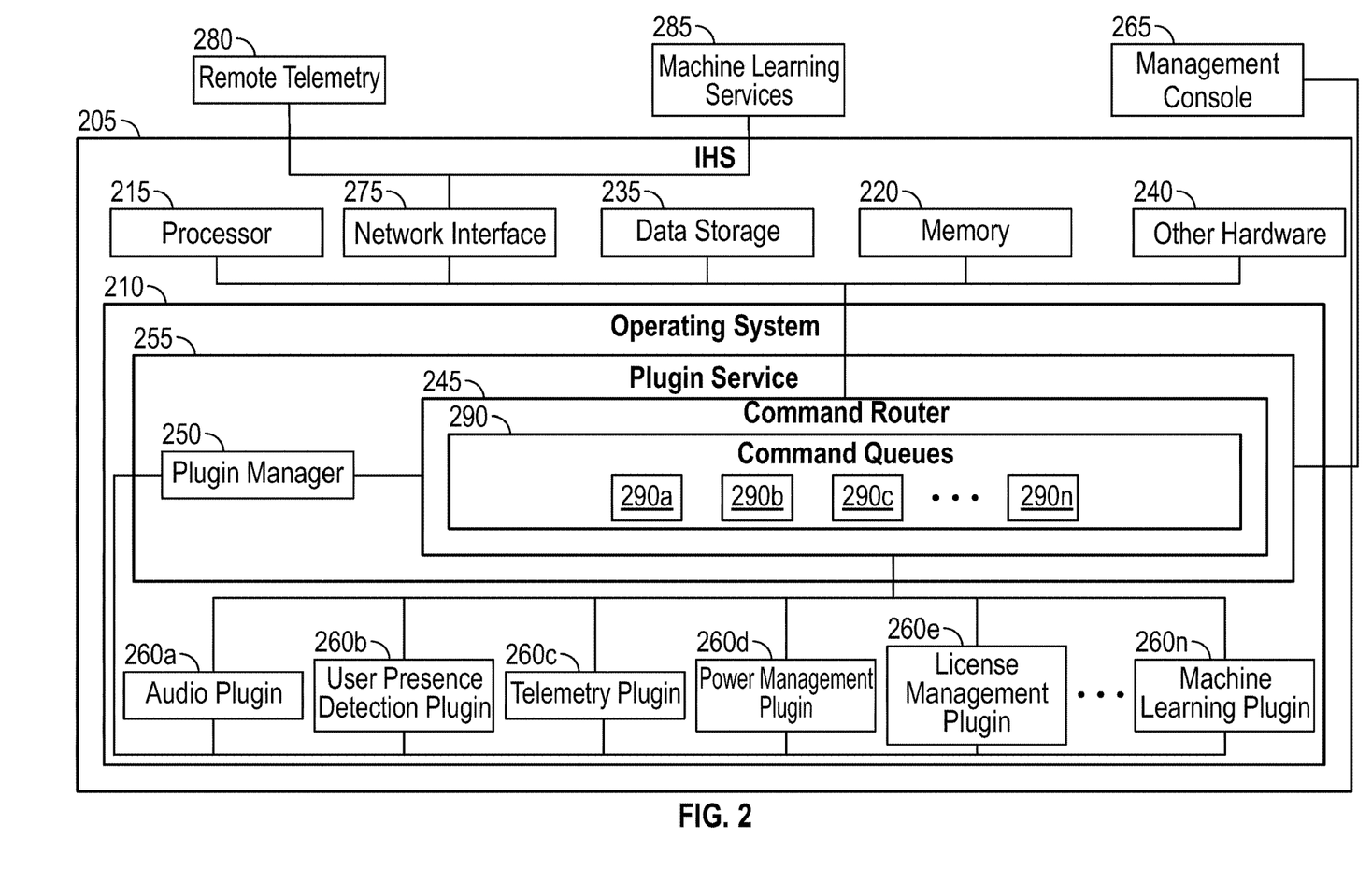
FIG. 2 is block diagram depicting certain components of a system configured according to various embodiments for adaptive runtime prioritization and resource management for component plugins of an IHS.

FIG. 2 is block diagram depicting certain components of a system configured according to various embodiments for adaptive runtime prioritization and resource management for component plugins of an IHS 205. As illustrated, IHS 205 may include an operating system 210 that supports the use of the hardware and software resources of the IHS. In the illustrated embodiment, the hardware resources of IHS 205 include the main processor(s) 215, a network interface 275, persistent storage drive(s) 235, system memory 220 and various other hardware resources 240 that may include integrated display(s), pointing devices, keyboards, sensors, and/or graphics processors. Software applications of the operating system 210 may utilize these hardware resources of IHS 205. However, as the number of software applications running within operating system 210 increases, contention for these hardware resources of the IHS 205 generally also increases. With each software application provided at least some ability to allocate use of hardware resources, the resource footprint of the operating system generally increases as the number of software applications increases. This resource footprint generally increases in size along with the number of software applications in use and does not decrease in size unless the software applications or the operating system correctly deallocate the hardware resources that were previously allocated.

Embodiments utilize a plugin architecture in which a plugin service 255 manages access to IHS hardware resources by a set of software plugins 260a-n. As illustrated, plugins 260a-n supported by an operating system 210 may include various types of plugins that provide specific services or capabilities. In some embodiments, the plugins 260a-n rely on a plugin service 255 in order to access the hardware resources 215, 275, 235, 220, 240 of the IHS 205. Accordingly, the plugin service 255 may provide plugins 260a-n with necessary hardware resources for carrying out their respective functions, but may prevent plugins 260a-n from consuming or otherwise encumbering hardware resources during periods when the plugins 260a-n are not in active use. In supporting the management of hardware resources used by plugins 260a-n, the plugin service 255 may utilize a plugin manager 250 that is responsible for configuring the operating state of plugins 260a-n.

In some embodiments, plugin manager 250 may be responsible for managing the lifecycle of plugins 260a-n supported by the plugin service 255. Accordingly, plugin manager 250 may individually activate and deactivate each of the supported plugins 260a-n. As described in additional detail below, plugin manager 250 may activate an individual plugin when a command has been received for delivery to that individual plugin. Upon activating a plugin, the plugin manager 250 may provide the activated plugin with access to certain hardware resources of the IHS. Once the activated plugin has completed processing of a received command, the plugin may be deactivated in order to relinquish control over the hardware resources of the IHS. In some embodiments, plugin manager 250 also support activation and deactivation of groups of plugins 260a-n, where such groups may be identified through machine learning evaluation of plugin activation data collected duration the processing of commands by plugins 260a-n. By activating plugins based on membership in learned groups, groups of related plugins may be activated and preemptively provided with shared access to certain hardware resources of an IHS. Deactivating plugins in groups reduces the operations that would otherwise be required to track plugins that have been activated and to appropriately deactivate each of these plugins when no longer in use.

As illustrated, a plugin service 255 may support a variety of plugins 260a-n. An audio plugin 260a may be used to support specific audio playback and processing capabilities. For instance, audio plugin 260a may support playback of audio that may be stored locally by IHS 205, such as in the data storage 235, or that may be stored remotely and accessed via a network interface 275. In some embodiments, audio plugin 260a may be configured to operate according to settings that are particularized for a specific user of IHS 205 and for specific scenarios of use of IHS 205, such as use of the IHS at a specific location or in a specific environment. The operation of audio plugin 260a may also utilize system memory 220 for buffering received audio and may utilize speakers 240 for playback of audio. Upon activation by plugin manager 250, audio plugin 260a may be provided with access to these relevant hardware resources. Upon deactivation, access to these hardware resources may be relinquished by audio plugin 260a.

Plugin service 255 may also support a user presence plugin 260b. As described with regard to FIG. 1, an IHS may include a sensor hub that utilizes various sensors of an IHS in order to determine a user's presence in proximity to an IHS. Various aspects of the operation of an IHS may be configured to respond to a change in the user's presence with respect to an IHS. For instance, an IHS may be configured to initiate certain power conservation modes in response to detecting a user moving away from an IHS. An IHS may be similarly configured to automatically initiate certain security features upon detecting the user moving away from an IHS, or upon detecting the presence of multiple users in proximity to an IHS. An IHS may similarly be configured to initiate certain audio playback capabilities upon detecting a user in proximity to the IHS. In some embodiments, certain low-priority functions of an IHS may be configured to operate during idle intervals, such as when a user is detected as moving away from the IHS. Accordingly, various different capabilities of an IHS may utilize user proximity determinations. In some embodiments, a user presence detection plugin 260b may be configured to interface with the user presence detection capabilities of an IHS and to signal any detected changes in user presence. As described in additional detail below, the user presence detection plugin 260b may notify other plugins of a detected change in user presence.

In some embodiments, the plugins supported by a plugin service 255 may include a telemetry plugin 260c that is configured to collect and report telemetry regarding the operation of the plugin service 255 and/or the operation of plugins 260a-n. For instance, telemetry plugin 260c may collect the data measuring the time required for various types of plugin commands to be processed by individual plugins 260a-n. In certain instances, telemetry plugin 260c may monitor the hardware resources utilized by the plugins 260a-n, either individually or collectively. Such telemetry information may be used to identify scenarios where the footprint of the plugin service 255 is gradually increasing, ostensibly due to hardware resources not being properly deallocated by the plugins 260a-n.

The timing information collected by telemetry plugin 260c may be utilized in some embodiments for routing incoming plugin commands to an appropriate command queue 290a-n. For instance, commands that have been identified as requiring significant processing time may be assigned to a lower priority command queue 290a-n. As indicated in FIG. 2, information collected by telemetry plugin 260c may be provided to a remote telemetry service 280 for a rigorous evaluation of collected telemetry information in order to identify characteristics for processing specific types of commands and for identifying plugins that may be responsible for an increasing resource footprint of the plugin service 255. As described with regard to FIG. 3, the operations of certain plugins, such as telemetry plugin 260c, may be designated as lower priority operations such that incoming commands directed to such plugins may be routed to a lower priority command queue 290a-n maintained by a command router 245 of the plugin service 255. Although the operations of telemetry plugin 260c may be important for improving the operation of plugin service 255, the operations of telemetry plugin 260c may nonetheless take lower priority than several other higher priority plugin operations, such as operations initiated in response to a user input.

As described, an IHS 205 may implement various responsive power operations, such as in response to the detection of a user in proximity to the IHS 205, or the lack of any user being detected in proximity to the IHS 205. For instance, upon detecting a user moving away from an IHS that is operating from battery power, a power management plugin 260d may initiate various power conservation operations intended to reduce power consumption while the user is not in proximity to the IHS 205. In other scenarios, power management plugin 260d may be configured to route available battery power for use in supporting high-power operations of IHS 205 when the user is detected in proximity to the IHS and to decrease battery power being used to charge external devices coupled to the IHS 205.

Another function of IHS 205 that may be supported via the plugin service 255 may be management of licenses for use of certain hardware and software systems of IHS 205, such as by license management plugin 260e. In some embodiments, license management plugin 260e may evaluate the validity of licenses maintained by IHS 205, or on behalf of IHS 205, in order to identify systems of IHS 205 that are no longer licensed, and thus no longer supported. In some embodiments, commands for license management plugin 260*e* may be routed to lower priority queues 290*a-n* in light of license management being an important function of IHS 205, but not necessarily a time-critical function.

As illustrated, plugin service 255 may also support use of a machine learning plugin 260*n*. As described, in some embodiments, plugin manager 250 may be configured to activate and deactivate groups of plugins 260*a-n* in response to a command router 245 detecting a specific command or a specific type of command for delivery to one of the plugins 260*a-n*. In some embodiments, such groups of plugins may be identified through operations of a machine learning plugin 260*n* that monitors the specific plugins 260*a-n* that are typically activated upon delivery of a specific plugin command by the command router 245. Similar to the operation of telemetry plugin 260*c*, the monitoring and data collection operations of machine learning plugin 260*n* may be supplemented by analytical operations provided by remote machine learning services 285. However, also similar to the operation of the telemetry plugin 260*c*, these learning operations of machine learning plugin 260*n* may be of a lower priority such that commands for delivery to the machine learning plugin 260*n* may be routed to a low priority command queue 290*a-n*.

Figure 3:
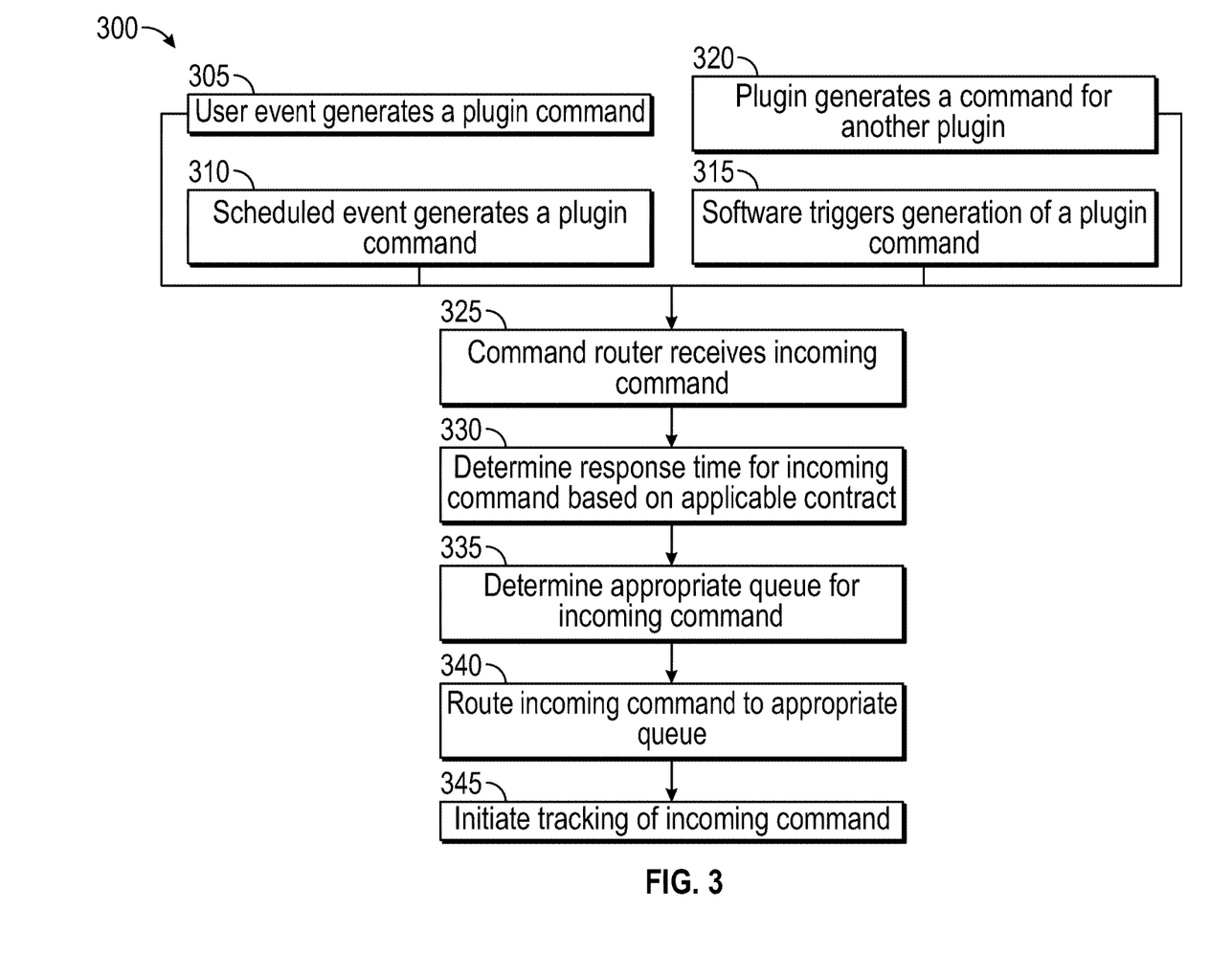
FIG. 3 is a flow chart illustrating certain aspects of a process according to embodiments for adaptive runtime prioritization and resource management for component plugins of an IHS.

FIG. 3 is a flow chart illustrating certain aspects of a process according to embodiments for adaptive runtime prioritization and resource management for component plugins of an IHS. As described with regard to FIG. 2, plugin commands may be received by a command router of a plugin service. Such plugin commands may be received by the command router from various different sources. In some instances, plugin commands may be generated, at block 305, in response to user events. For example, a user operating an IHS may issue a signal, such as via a pointing device input or via a voice command, for initiating playback of audio. In another example, a user may issue a signal for launching a specific software application that is supported by a plugin, such as a password management application provided by a plugin. In such instances, plugin commands generated based on user inputs are delivered to a command router of the plugin service. In some embodiments, such user-initiated plugin commands may be categorized as high-priority plugin commands.

In other scenarios, plugin commands may be generated, at block 310, based on scheduled events. For instance, certain license management functions supported by a license management plugin may be initiated at scheduled intervals. In another example, operations for collecting and reporting of telemetry data by a telemetry plugin may also be initiated using scheduled events. A machine learning plugin may be similarly prompted to provide collected data at scheduled intervals. In some embodiments, such schedule-initiated plugin commands may be categorized as low priority plugin commands.

As illustrated, in other scenarios, plugin commands may be generated, at block 315, in response to triggers by software applications of an IHS, or from remote systems coupled to the IHS. For instance, certain plugins may support operations by software applications of the operating system that are not plugins supported by a plugin service. For example, an audio plugin may receive commands from a third-party remote music service, where such commands may be used to configure the audio plugin for accessing newly available remote music libraries or streaming music sources. In another example, a license management plugin may be periodically provided with updated license information via plugin commands delivered by a remote license management service.

In other scenarios, plugin commands may be generated, at block 320, by other plugins supported by the plugin service. As described, a user presence detection plugin may receive notification from sensor capabilities of an IHS regarding detected changes in the proximity of a user to the IHS. Also as described, various plugins may be configured to respond to such changes in user detection, such as reducing power or initiating audio. Accordingly, a user presence detection plugin may be configured to issue user presence notifications to other plugins via commands that are issued to the command router by the user presence detection plugin. In this manner, plugins are provided with a low overhead and easily adaptable mechanism for communicating with other plugins. As described, existing software systems may utilize various different software applications that each allocate their own respective hardware resources. In such existing software systems, software applications each operate as a separate process and may communicate with each other using inter-process communications (IPC). Such mechanisms for communication are computationally costly and difficult to modify. Compared to existing rigid capabilities for communications between software applications, the described plugin system allows for plugins to deliver commands to other plugins without the sending plugin having to verify the current operating state of the destination plugin. Additionally, the described plugin system allows for a single plugin command to be issued by the sending plugin, with the command router responsible for delivering the command to multiple different plugins.

At block 325, the command router receives an incoming plugin command from one of the described sources of plugin commands. At block 330, the command router evaluates the incoming command in order to determine the time constraints for delivering a response to the incoming command. In certain embodiments, each incoming command may have an associated contract that may specify time constraints for its processing. For instance, certain incoming commands may have an associated contract specifying real-time processing of the commands. For example, in order to minimize latency in responding to user inputs, some or all of the incoming commands resulting from user inputs, such as commands generated at block 305, may be associated with a real-time contract. Other plugin commands that may be associated with real-time contracts may include, for example, commands from sensor components signaling changes in detected user presence, commands in support of ongoing multimedia sessions in which the user is actively participating and commands related to changes in the security posture of an IHS.

On the other end of spectrum, as described, various other plugin commands may be associated with plugin operations that do not require an immediate response. As described, certain operations by a license management plugin may be deferred until an IHS is idle. Similarly, telemetry gathering operations may be deferred until an idle period of an IHS's operations. Data collection operations by a machine learning plugin may likewise be deferred until no higher priority operations remain pending, or at least until no pressing higher priority operations remain pending. The contract associated with such deferrable plugin commands may specify that the processing of the command may be deferred indefinitely or may specify a generous time interval for completing processing of the command.

Various types of intermediate contracts may exist between commands with real-time contracts and commands with deferrable contracts. For instance, commands related to power management operations may have a contract specifying a short interval for completing processing of the request in light of the need to support power settings that may be made in response to detecting elevated temperatures or depleted battery conditions. Similarly, commands used to initiate collection of additional telemetry may have a contract specifying a short interval for processing the command in order to support collection of telemetry data in response to detected faults or errors. In another example, commands used to provide an audio plugin with supplemental information regarding a video being streamed by the plugin, such as providing song titles and lyrics, may be associated with contracts that specify a longer interval for completing such commands.

Based on the response time specified by the contract of an incoming command, the appropriate queue is identified for storing the incoming command until the command can be dispatched for processing. As described with regard to FIG. 2, a plugin service may include a command router that maintains a set of weighted queues for use in storing received plugin commands. In some embodiments, each of the queues in the set of weighted queues may be assigned a scaling factor, with a highest priority queue assigned the smallest scaling factor and the lowest priority queue assigned the largest scaling factor. Intermediate priority queues may be assigned progressively higher scaling factors that increase as the priority associated with a queue decreases. Accordingly, in such embodiments the response time determined from the contract associated with a command is scaled using the scaling factor of the queue to which the command is assigned by the command router.

Based on the response time indicated by the contract associated with an incoming command and further based on additional characteristics of the command, such as the plugin(s) to which the incoming command is to be delivered, at 340, the command router of the plugin service assigns each incoming command to one of the weighted queues. For instance, incoming commands associated with a real-time contract, such as commands initiated by a user, and commands directed towards a plugin associated with high priority tasks, such as supporting delivery of streaming multimedia, may be assigned to the high priority queue that utilizes the smallest scaling factor. Incoming commands associated with intermediate response time contracts, such as commands in support of web browser activity by user, may be assigned to an intermediate priority queue with the response time scaled based on the scaling factor associated with the assigned queue. Incoming commands associated with deferrable response time contracts may be assigned to the lowest priority queues that utilize the greatest scaling factors. Once the command router has assigned an incoming command to one of the weighted queues, at block 345, the command router initiates tracking of the incoming command by recording the time at which the incoming command was queued and calculating a deadline for completing prioritized processing of the incoming command. The interval that is allotted for completing processing of an incoming command by the plugin service may be calculated as the time at which the incoming command was queued until the expiration of the scaled response time for the queued command.

Figure 4:
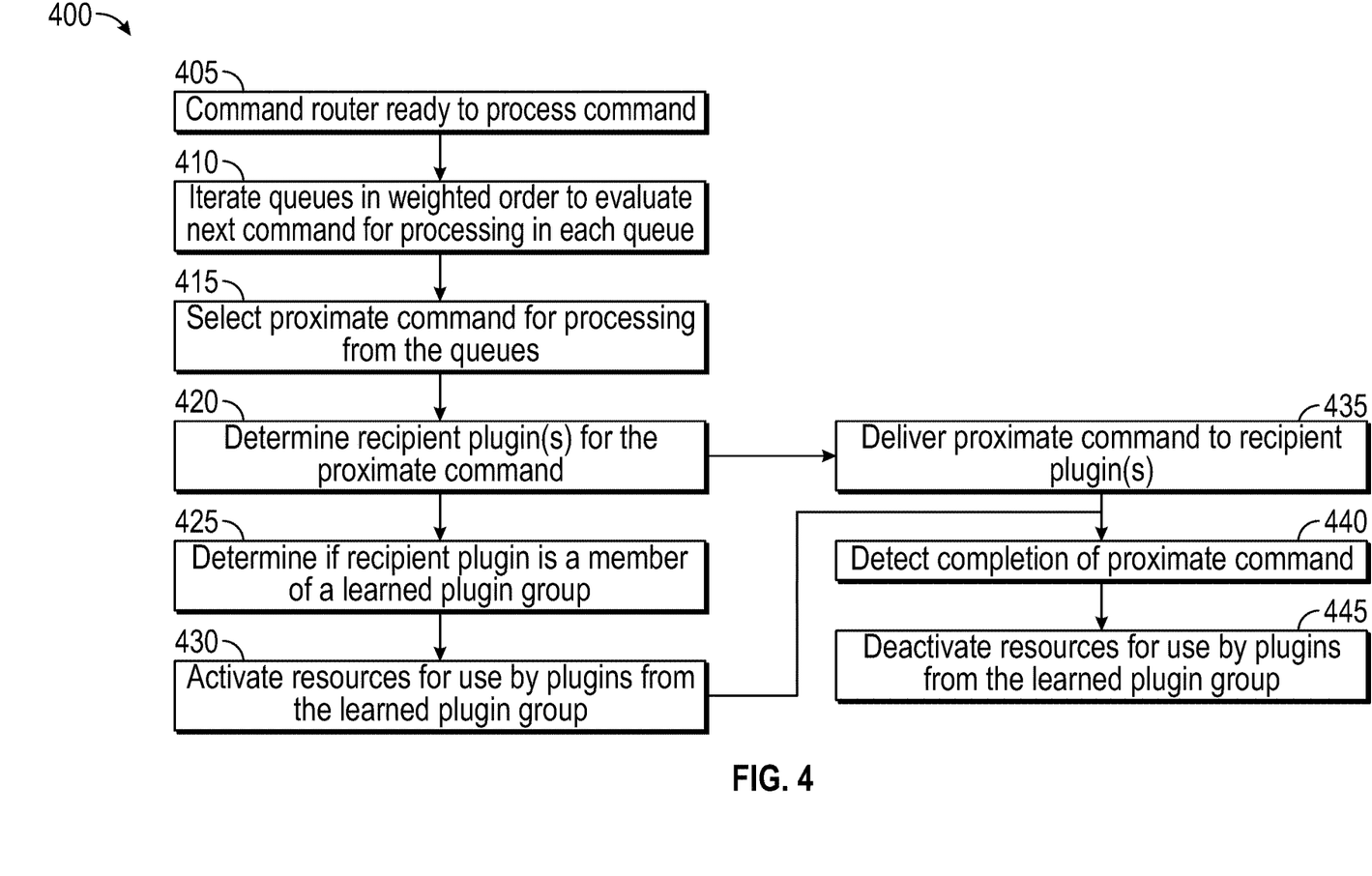
FIG. 4 is a flow chart illustrating certain aspects of a process according to embodiments for adaptive runtime prioritization and resource management for component plugins of an IHS.

FIG. 4 is a flow chart illustrating certain aspects of a process according to embodiments for adaptive runtime prioritization and resource management for component plugins of an IHS. Whereas FIG. 3 describes certain embodiments for receiving and evaluating incoming commands and routing the commands to one of the weighted command queues maintained by the command router, FIG. 4 describes embodiments for selecting commands from the weighted queues and managing the resources utilized by plugins used in processing the selected command. In some embodiments, the process of FIG. 3 for receipt and sorting of incoming commands may be implemented as one thread of the command router and the process of FIG. 4 for selecting and processing the commands from the command queues may be implemented as another concurrent thread of the command router. Accordingly, some embodiments may begin, at block 405, with this concurrent thread of the command router ready to process a plugin command.

At block 410 the command router may identify a proximate plugin command for processing by iterating through the command queues in weighted order. For instance, the command router may first evaluate the highest priority command queue. In some embodiments, the highest priority command queue may be used for real-time commands with response times that are not scaled. In such embodiments, at block 415, the command router may select the proximate command for processing from the highest priority command queue. If the highest priority command queue is empty, the command router may proceed to evaluate the next command for processing in the next highest priority queue. The command router may determine whether to select this next command for processing based on the scaled response time for this command. If the scaled response time is approaching or has passed, the command router may select this command for processing as the proximate command. If the scaled response time for this next command is not approaching or if this queue is empty, the command router may proceed to the next highest priority queue.

As described with regard to FIG. 3, the command router may track response times for each individual plugin command that is received. Using this information, the command router may maintain response time metrics for each of the individual weighted queues. Based on such response time metrics, the command router may evaluate whether the next command for processing in a particular queue can be deferred, or whether processing of that next command must be initiated in order for the command to be completed within its scaled response time. In some embodiments, the response time metrics associated with the weighted queues may be used to tune the scaling factors associated with the weighted queues. For instance, delays in processing intermediate priority commands may warrant reducing the scaling factor associated with a particular queue in order to reduce the time commands wait in this queue. Iterating through each of the weighted queues, the command router selects the highest priority command that is pending, while also deferring processing of some commands in apportioning available processing resources between the weighted command queues.

In this manner, a proximate command for processing may be selected from the weighted queues maintained by a command router. At block 420, the recipient plugin for the proximate command is determined. In some instances, multiple recipient plugins may be designated for a single command. In some instances, a recipient plugin will be designated within the command itself, or within metadata associated with the command. With the recipient identified, at block 435, the proximate command may be delivered to the recipient plugin. In some instances, the recipient plugin may be activated upon delivery of the proximate command, thus allocating hardware resources for use by the recipient plugin. Concurrent with or immediately upon delivery of the proximate command to the recipient plugin, at block 425, the command router determines whether the recipient plugin is a member of a learned plugin group. In some instances, the recipient plugin may already be activated and in operation when the proximate command is ready for delivery. As described with regard to FIG. 1, in some instances, frequently used plugins may be cached in a manner that supports rapid initialization and activation of these plugins. For instance, a telemetry plugin may be frequently used in collecting and reporting telemetry data, but such a plugin may be frequently activated and deactivated. In embodiments where certain plugins may be cached, the command router may signal loading and activation of a cached plugin upon determining that the recipient plugin for the proximate command is cached. In some embodiments, the machine learning plugin may evaluate plugin activation data in order to identify plugins that should be cached in particular scenarios, where the machine learning determinations may be based both on the frequency of use of plugins and the time required to load and activate the plugins.

As described with regard to FIG. 2, the plugin service may include a machine learning plugin that monitors plugin activations in response to incoming plugin commands received and dispatched by the command router. Using low priority plugin commands, a remote machine learning service may periodically collect plugin activation data gathered by such a machine learning plugin. Based on the collected plugin activation data, the remote machine learning service may identify groups of plugins that are activated and deactivated together in response to particular plugin commands. For example, a command directed to a user presence detection plugin may result in the user presence detection plugin in turn notifying multiple other plugins regarding a user proximity event. As described, various operations of an IHS may be configurable in response to the detection of a user's proximity with respect to the IHS. In such instances, the user presence detection plugin may issue user presence notification commands to other plugins responsible for such operations, such as initiating changes to audio output by audio plugin in response to a user moving further away from an IHS. In such instances, an additional plugin may be responsible for maintaining customizations and settings for regular users of an IHS. This user profile plugin may thus be additionally activated in order to correctly modify output of the audio plugin. By monitoring plugin activations, a machine learning plugin may collect sufficient information by which remote machine learning resources may identify such groups of plugins that are typically activated in response to a particular plugin command. For instance, machine learning resources may identify groups of plugins that are activated in response to plugin commands providing notification of the detection of an IHS being used at a particular location, such as a sequence of applications and customizations enacted when using the IHS in a conference room or at the user's home. In another example, machine learning resources may identify groups of plugins that are activated in response to plugin commands providing notification of the IHS being configured in a particular physical posture, such as configuration of an IHS in a tent mode indicating use of particular multimedia applications.

As described with regard to FIG. 2, a plugin manager may be responsible for activating and deactivating each of the individual plugins supported by a plugin service. By activating and subsequently deactivating plugins in order to support processing of individual plugin commands, the resource footprint of the plugin service is managed and prevented from resulting in eventual resource exhaustion typically experienced by operating systems allowing software applications to individually manage their own hardware resources. At block 430, the plugin manager may activate each of the plugins from the learned plugin group. The learned plugin group includes the one or more recipient plugins as well as any additional plugins identified as also been triggered by particular plugin command. In some instances, activation of a plugin may require initiating a new plugin process, while other instances may only require activating or initializing hardware resources for use by a plugin. By activating a group of plugins, all of the plugins triggered by an incoming plugin command may be preemptively initialized, thus improving the response times by these plugins for processing plugin commands and improving overall efficiency of the command router in processing incoming commands.

At block 440, the command router detects the completion of the proximate command by the recipient plugin. As described, a command router may utilize the collected actual response time information for processing commands in maintaining response time metrics for each of the weighted command queues. At block 445, the command router may deactivate the recipient plugin, thus deallocating hardware resources designated for use by recipient plugin. In some embodiments, the command router may also deactivate each of the other plugins from a learned plugin group, further ensuring that allocated resources are eventually deallocated. In some instances, a command router may delay the activation of one or more plugins during periods of high activity for a particular plugin. In some instances, a command router may deactivate any plugins that are idle for a prolonged duration.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for supporting operation of a plurality of software plugins of an IHS (Information Handling System), the method comprising:
   receiving an incoming plugin command;
   storing the incoming plugin command to a queue of a plurality of progressively weighted queues, and wherein the queue is selected for storing the incoming plugin command based on a time constraint associated with the incoming plugin command;
   selecting a proximate command for processing from a queue of the plurality of queues, wherein the proximate command is selected based on a weighted time for processing the proximate command;
   determining a recipient plugin of the proximate command;
   determining when the recipient plugin is a member of a first plugin group; and
   activating a plurality of plugins of the first plugin group, wherein the activation of a plugin allocates use of IHS resources to the activated plugin.

2. The method of claim 1, wherein the first plugin group is learned based on monitoring of plugin activations in response to incoming plugin commands.

3. The method of claim 2, wherein the incoming plugin command comprises a user proximity notification.

4. The method of claim 1, further comprising:
   deactivating the plurality of plugins of the first plugin group in response to the completed processing of the proximate command by the recipient plugin.

5. The method of claim 1, wherein each of the plurality of queues are progressively weighted using a scaling factor.

6. The method of claim 5, wherein the weighted time for processing the proximate command is determined according to the scaling factor of the queue used to store the proximate command.

7. The method of claim 1, wherein the time constraint associated with the incoming plugin command designates the incoming plugin command as a real-time command.

8. An Information Handling System (IHS) configured for supporting operation of a plurality of software plugins of the IHS, the IHS comprising:
   one or more processors; and
   a memory device coupled to the one or more processors, the memory device storing computer-readable instructions that, upon execution by the one or more processors, cause the IHS to:
      receive an incoming plugin command;
      store the incoming plugin command to a queue of a plurality of progressively weighted queues, and wherein the queue is selected for storing the incoming plugin command based on a time constraint associated with the incoming plugin command;
      select a proximate command for processing from a queue of the plurality of queues, wherein the proximate command is selected based on a weighted time for processing the proximate command;
      determine a recipient plugin of the proximate command;
      determine when the recipient plugin is a member of a first plugin group; and
      activate a plurality of plugins of the first plugin group, wherein the activation of a plugin allocates use of IHS resources to the activated plugin.

9. The IHS of claim 8, wherein the first plugin group is learned based on monitoring of plugin activations in response to incoming plugin commands.

10. The IHS of claim 9, wherein the incoming plugin command comprises a user proximity notification.

11. The IHS of claim 8, the memory device storing additional computer-readable instructions that, upon execution by the one or more processors, further cause the system to deactivate the plurality of plugins of the first plugin group in response to the completed processing of the proximate command by the recipient plugin.

12. The IHS of claim 8, wherein each of the plurality of queues are progressively weighted using a scaling factor.

13. The IHS of claim 12, wherein the weighted time for processing the proximate command is determined according to the scaling factor of the queue used to store the proximate command.

14. The IHS of claim 8, wherein the time constraint associated with the incoming plugin command designates the incoming plugin command as a real-time command.

15. A non-transitory computer-readable storage device having program instructions stored thereon for supporting operation of a plurality of software plugins of an Information Handling System (IHS), upon execution by one or more processors, the program instructions cause the one or more processors to: receive an incoming plugin command; store the incoming plugin command to a queue of a plurality of progressively weighted queues, and wherein the queue is selected for storing the incoming plugin command based on a time constraint associated with the incoming plugin command; select a proximate command for processing from a queue of the plurality of queues, wherein the proximate command is selected based on a weighted time for processing the proximate command; determine a recipient plugin of the proximate command; determine when the recipient plugin is a member of a first plugin group; and activate a plurality of plugins of the first plugin group, wherein the activation of a plugin allocates use of IHS resources to the activated plugin.

16. The computer-readable storage device of claim 15, wherein the first plugin group is learned based on monitoring of plugin activations in response to incoming plugin commands.

17. The computer-readable storage device of claim 16, wherein the incoming plugin command comprises a user proximity notification.

18. The computer-readable storage device of claim 15, wherein each of the plurality of queues are progressively weighted using a scaling factor.

19. The computer-readable storage device of claim 18, wherein the weighted time for processing the proximate command is determined according to the scaling factor of the queue used to store the proximate command.

20. The computer-readable storage device of claim 15, wherein the time constraint associated with the incoming plugin command designates the incoming plugin command as a real-time command.

* * * * *